RE24345

Oct. 2, 1956      C. R. BERGEVIN      2,765,022

SPRING COILING MACHINE

Filed Dec. 16, 1954      4 Sheets—Sheet 1

Fig-1

INVENTOR.
CHARLES R. BERGEVIN
BY   S. Jay Teller
ATTORNEY Oct. 2, 1956  C. R. BERGEVIN  2,765,022
SPRING COILING MACHINE
Filed Dec. 16, 1954  4 Sheets-Sheet 2

Fig_2

INVENTOR.
CHARLES R. BERGEVIN
BY
S. Jay Teller
ATTORNEY

INVENTOR.
CHARLES R. BERGEVIN

Oct. 2, 1956  C. R. BERGEVIN  2,765,022
SPRING COILING MACHINE

Filed Dec. 16, 1954  4 Sheets-Sheet 4

INVENTOR.
CHARLES R. BERGEVIN
BY S. Jay Teller
ATTORNEY

United States Patent Office 2,765,022
Patented Oct. 2, 1956

2,765,022

SPRING COILING MACHINE

Charles R. Bergevin, Torrington, Conn., assignor to The Torrington Manufacturing Company, Torrington, Conn., a corporation of Connecticut Application December 16, 1954, Serial No. 475,686

16 Claims. (Cl. 153—65)

This invention relates to a cyclically operable spring making machine wherein the springs are formed by the coiling of a longitudinally moving wire as the result of engagement thereof with a relatively fixed coiling point, and the invention relates more particularly to a machine of the type wherein the longitudinal movement of the wire is effected by a feed mechanism including wire engaging means and including a reciprocable or oscillable means having one reciprocation or oscillation during each machine cycle. A machine of the said type is shown in the Bergevin and Nigro Patent No. 2,119,002 for Spring Coiling Machine, dated May 3, 1938.

In a machine of the type referred to, as exemplified in the said patent, the wire engaging means of the feed mechanism is operable only during movement of the reciprocating means in one direction, the said feed mechanism therefore being idle during a large portion of each cycle of the machine. The general object of the present invention is to provide a spring coiling machine wherein the wire engaging means of the feed mechanism is operable during movement of said reciprocating means in both directions, the wire engaging means therefore being operable during a much larger portion of each cycle of the machine with a corresponding increase in the productive capacity of the machine.

Another general object of the invention is to provide a machine having the characteristics above set forth and having during each cycle at least one interval of time intervening between successive feeding movements and having a cut-off mechanism which is operated during each cycle and during said intervening interval, at least one spring being formed and cut off during each cycle.

Another general object of the invention is to provide a machine having said characteristics and having two separate wire feeding movements during each cycle with intervals of time between successive movements and having a cut-off mechanism which is operated twice during each cycle, two springs being formed and cut off during each cycle.

Still another general object of the invention is to provide a machine having the characteristics set forth in the last preceding paragraph and also having means operated twice during each cycle for varying the diameter or the pitch or both the diameter and the pitch of two springs formed during each cycle.

Still another object of the invention is to provide a machine having some or all of the characteristics above set forth and also adapted for the continuous coiling of springs of indefinite length.

Further and more specific objects of the invention are to provide various features of mechanical construction and combinations of such features which facilitate the attainment of said more general objects of the invention.

The accompanying drawings show in detail one embodiment of the invention and show schematically several alternative embodiments of the invention. It will be understood that the drawings are not to be construed as defining or limiting the scope of the invention, the claims forming a part of this specification being relied upon for that purpose.

Figure 1:
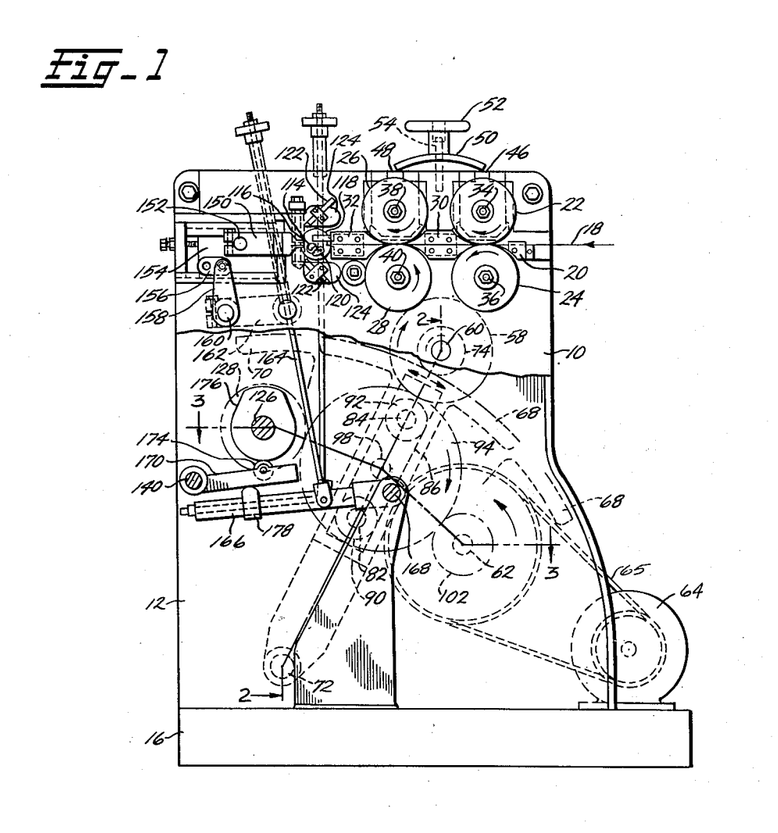
Fig. 1 is a combined front elevational and sectional view of a spring coiling machine embodying the invention, the sectional portion of the view being taken along the line 1—1 of Fig. 2.
Figure 2:
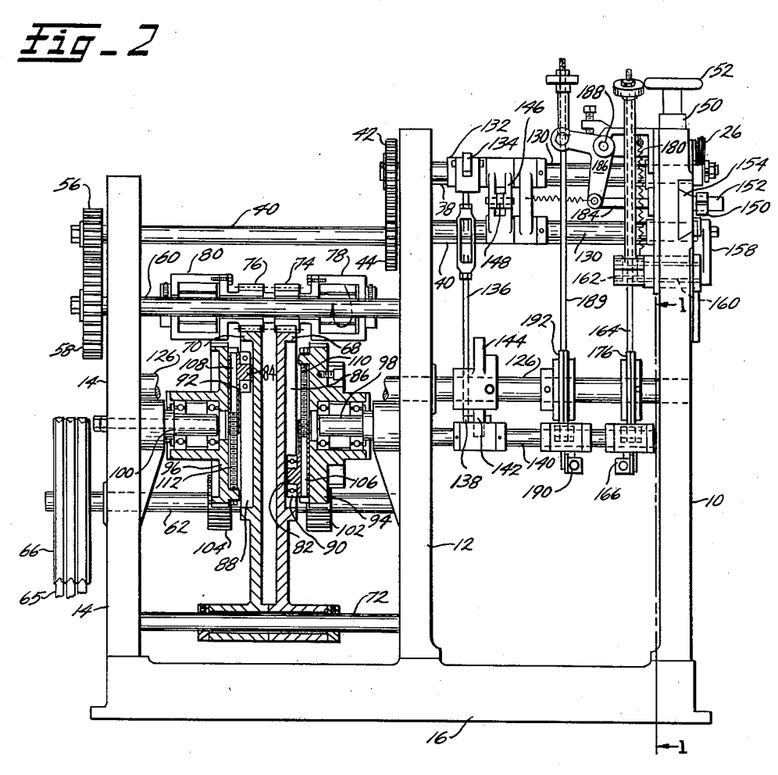
Fig. 2 is a left side view of the machine with cover plates omitted, a portion of the machine at the left between the intermediate and rear frame members being in section along the line 2—2 of Fig. 1.
Figure 3:
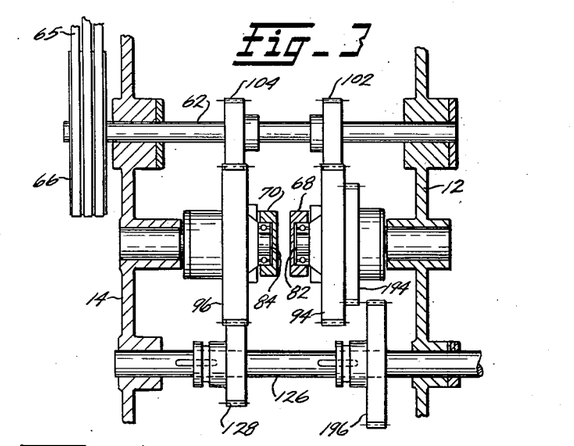
Fig. 3 is a fragmentary sectional view of the machine taken along the line 3—3 of Fig. 1.

Figs. 1 to 3 of the drawings show a machine generally similar to that shown in the said Patent 2,119,002 but having different and additional mechanism to which the present invention more particularly relates. Reference is made to the said patent for any details of construction or manner of operation not herein fully disclosed.

The machine comprises spaced upright frame members 10, 12 and 14 mounted on a suitable base 16, with the various wire feeding and coiling devices mounted on the front frame member 10 and with the several mechanisms for operating said devices mounted between the members 10 and 12 or between the members 12 and 14. The machine may have cover plates on the sides thereof secured to said frame members, but such plates are omitted from the drawings for clarity of illustration.

The line of wire feed is indicated at 18 in Fig. 1, the wire being fed through a preliminary guide 20 and between pairs of cooperating rotatable feed rolls 22, 24 and 26, 28. The feed rolls when rotated serve to project the wire toward the left so as to be engaged by wire coiling tools or devices as hereinafter described in detail. Wire guides 30 are provided between the feed rolls 22, 24 and the feed rolls 26, 28 and additional wire guides 32 are provided between the feed rolls 26, 28 and the coiling devices.

The feed rolls 22, 24 are carried by shafts 34, 36 and the feed rolls 26, 28 are carried by shafts 38, 40, all of the said shafts being mounted in bearings in the frame members 10 and 12. The shafts 38, 40 are connected by meshing gears 42, 44 and the shafts 34, 36 are connected by similar meshing gears which are not shown. The shafts 34 and 38 for the upper feed rolls 22 and 26 are capable of slight vertical movement, being mounted in vertically movable bearing blocks 46 and 48. A bowed spring 50 is provided which rests at its ends upon the bearing blocks 46 and 48 and which is engaged by a hand wheel 52 engaging a threaded member 54. By turning the hand wheel 52, the spring 50 may be relatively flattened to apply downward pressure to the bearing blocks 46 and 48 and to thus apply downward pressure to the feed rolls 22 and 26 so that they grip the wire.

The lower feed roll shafts 36 and 40 are extended toward the rear of the machine and have additional bearings in the rear frame member 14. The shaft 40 is provided with a gear 56 and the shaft 36 has a similar gear 57 which is shown only in Figs. 4 and 5. Both of the last said gears mesh with a gear 58 on a feed shaft 60 mounted in suitable bearings in the frame members 12 and 14. The feed shaft 60 is rotated by the mechanism and in the manner to be described and, when rotated, it rotates the shafts 36 and 40 which in turn rotate the several feed rolls for feeding the wire toward the left as previously stated.

A main drive shaft 62 is provided, this being mounted in suitable bearings in the frame members 12 and 14. The drive shaft 62 is continually driven, as for instance by a motor 64, the motor being connected with the shaft by belts 65 engaging a belt pulley 66 secured to said shaft.

For rotating the feed shaft 60 in the feeding direction thereof, there is provided a reciprocable means having gear teeth spaced in the direction of reciprocation and there is also provided means operable by the drive shaft 62 for causing one complete reciprocation of the reciprocable means during each cycle of the machine. The reciprocable means may be widely varied as will be hereinafter fully apparent but, as shown in Figs. 1 to 3, the feed means comprises two separate oppositely reciprocable members 68 and 70 which are preferably gear segments separately movable about a common horizontal pivotal axis. The said members or gear segments are hereinafter referred to as the first and second members or gear segments. As shown, said gear segments are mounted for pivotal movement on a horizontal pivot rod 72 extending between the frame members 12 and 14.

Two gears 74 and 76 are provided which mesh with the teeth of reciprocable means and each of which is rotatable thereby in one direction during the first portion of each cycle and is rotatable thereby in an opposite direction during the second portion of each cycle. As shown, the gears 74 and 76 are mounted directly on the feed shaft 60, but such mounting is not essential as will be hereinafter fully apparent. When there are two separate gear segments such as 68 and 70 as shown, said gears 74 and 76 mesh respectively with the teeth of said segments, the gears being hereinafter referred to as the first and second gears.

Unidirectional clutches 78 and 80 are operatively interposed respectively between the gears 74 and 76 and the feed shaft 60. When said gears are mounted directly on the feed shaft as shown, the clutches are also mounted directly on the feed shaft, but when the gears are otherwise mounted the clutches may be also otherwise mounted. The unidirectional clutches may be of any usual or preferred type and each of them has its driving element connected with the corresponding gear 74 or 76 and has its driven element connected with the feed shaft 60. The clutches are so constructed that each of them serves to drive the feed shaft only in the feeding direction, and in the machine as shown the feeding direction is the clockwise direction.

For oscillating the gear segments 68 and 70 there are provided two oppositely disposed crankpins 82 and 84 which are rotatable about a common horizontal axis parallel with the axis of oscillation, the crankpins being entered in radial slots 86 and 88 formed respectively in the gear segments 68 and 70. Ball bearings 90 and 92 respectively surround the crankpins 82 and 84, the outer races of the ball bearings engaging the side walls of the radial slots 86 and 88 in the segments 68 and 70. A crankpin and its bearing are herein sometimes referred to collectively as a "crankpin."

The crankpins 82 and 84 carried respectively by gears 94 and 96 which are rotatably mounted on studs 98 and 100 projecting respectively from the frame members 12 and 14. The gears 94 and 96 mesh respectively with gears 102 and 104 secured to the drive shaft 62 and the gears 94 and 96 are therefore rotated in the same direction and at the same speed. The crankpins 82 and 84 are mounted indirectly on the gears 94 and 96 by means of blocks 106 and 108 adjustable by means of screws 110 and 112 for changing the distances of the crankpins 82 and 84 from the axis of rotation.

By means of the screws 110 and 112 the pins 82 and 84 may be adjusted to change the amplitude of oscillation of the gear segments 68 and 70. Ordinarily the two segments will have the same amplitude of oscillation, but they may have different amplitudes. For some purposes, one of the pins may be moved to dead center so that the corresponding segment will have zero amplitude, that is, it will be stationary.

The gears 94 and 96 are continually rotated and as they rotate the gear segments 68 and 70 are caused to make one complete reciprocation during each complete rotation of the gears, that is, during each cycle of the machine. Inasmuch as the crankpins 82 and 84 are oppositely disposed, the gear segments 68 and 70 reciprocate oppositely with each gear segment moving in a direction opposite to that of the other.

Referring more particularly to Figs. 4 to 7, each cycle of the machine may be regarded as starting with the movement of the gear segment 68 toward the left, the gear segment 70 moving toward the right during the first portion of the cycle. During said first portion of the cycle the gear 74 is moved in the clockwise direction and the clutch 78 operates to drive the feed shaft in the clockwise direction, that is, in the feeding direction. During said first portion of the cycle the gear 76 is rotated in the counterclockwise direction, the clutch 80 being ineffective to drive the feed shaft. During the second portion of the cycle the gear segment 68 is moved toward the right and the gear 74 is moved in the counterclockwise direction, the clutch 78 being ineffective to drive the feed shaft. During said second portion of the cycle the gear segment 70 moves toward the left and the gear 76 is moved in the clockwise direction and the clutch 80 operates to drive the said shaft in the clockwise direction, that is, in the feeding direction. From the foregoing it will be apparent that through the alternating action of the two gear segments and the corresponding gears and clutches, the feed shaft 60 is driven in the feeding direction during both portions of each cycle.

Figures 4, 5, 6, 6A, 7, 8:
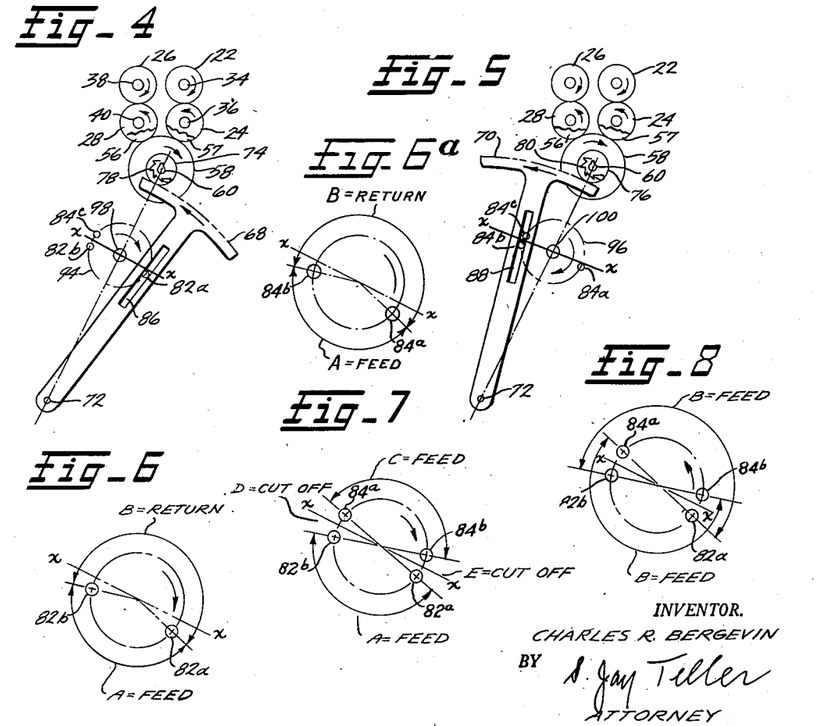
Fig. 4 is a schematic view showing the action of one of the gear segments that drive the feed rolls.
Fig. 5 is a view similar to Fig. 4 but showing the action of the other of the gear segments.
Fig. 6 is a diagram showing the timing incident to one gear segment.
Fig. 6a is a diagram similar to Fig. 6 but showing the timing incident to the other gear segment.
Fig. 7 is a diagram similar to Fig. 6 but showing the combined timing incident to both gear segments.
Fig. 8 is a diagram similar to Fig. 7 but showing the timing incident to an alternative manner of machine operation.

The drive shaft 62 may be driven in either direction but when the segments, gears and clutches are constructed and arranged as shown, the drive shaft is advantageously rotated in the counterclockwise direction, the gears 94 and 96 and the crankpins 82 and 84 resultantly rotating in the clockwise direction. Due to the relationship of the crankpins to the pivotal axis, each pin moves its gear segment faster in one direction than in the opposite direction, that is, each gear segment is moved in one direction in a little less than a half-cycle and is moved in the opposite direction in a little more than a half-cycle. Referring to Figs. 4 and 6, each cycle begins with the pin 82 at the extreme right position 82ᵃ which is somewhat beyond or below a line x—x extending through the axes of the studs 98 and 100 and perpendicular to a plane through the last said axes and the axis of the pivot rod 72. The pin moves clockwise from the position 82ᵃ to the opposite extreme left position 82ᵇ and correspondingly moves the segment 68 toward the left as indicated by the arrow in a period that is a little less than a half-cycle as represented by A. The gear 74 is correspondingly rotated and the action of the clutch 78 is such that the feed rolls rotate in the feeding direction during said period. The pin 82 then moves clockwise from the left position 82ᵇ to the right position 82ᵃ and correspondingly moves the segment 68 toward the right in a period that is a little more than a half-cycle as represented by B. The gear is correspondingly rotated but there is no feeding by the clutch 78 during the last said period.

Referring to Figs. 5 and 6ᵃ, it will be seen that the pin 84 moves clockwise from the extreme left position 84ᵇ to the extreme right position 84ᵃ and correspondingly moves the segment 70 toward the right in a period that is a little more than a half-cycle, said period being of the same duration as the period B. The gear 76 is correspondingly rotated but there is no feeding by the clutch 80 during the last said period. Position 84ᵃ of the pin 84 as shown in Fig. 5 is in alignment with position 82ᵃ of the pin 82 as shown in Fig. 4, but the actual pins are 180° apart and are never in alignment. The described movement of the segment 70 toward the right from the Fig. 5 position is substantially simultaneous with the described movement of the segment 68 toward the left from the Fig. 4 position. The pin 84 then moves clockwise from the right position 84ᵃ to the left position 84ᵇ and correspondingly moves the segment 70 toward the left as indicated by the arrow in a period that is a little less than a half-cycle, said period being of the same duration as the period A. The gear 78 is correspondingly rotated and the action of the clutch 80 is such that the feed rolls rotate in the feeding direction through the last said period. The two periods of rotation of the feed rolls resulting from the action of the segments 68 and 70 are within the same cycle but they are in opposite phase. It will be observed that, at the beginning of the cycle as shown in Fig. 4, the pin 84 is at the position 84ᶜ which is diametrically opposite the position 82ᵃ of the pin 82. It is therefore evident that, at the beginning of the cycle, the pin 84 has moved beyond its extreme position 84ᵇ at the left and has already started to move the segment 70 toward the right.

Fig. 7 shows the feeding period A for the segment 68 which is the same as shown in Fig. 6, and Fig. 7 also shows the feeding period for the segment 70 which is identified as C and which is of the same duration as the period A but in opposite phase. Inasmuch as each of the periods A and C is less than a half-cycle, there are intervals D and E between them as indicated in Fig. 7. During each feeding movement the feeding speed is increased from zero to a maximum and is then decreased from the maximum to zero. The feed rolls are idle or stationary during the intervals D and E. The described construction and arrangement of the crankpins and the gear segments and the gears and the clutches constitute means for providing said intervals D and E.

The extent of wire feeding during the respective portions of each cycle can be changed within the capacity of the machine by adjusting the eccentricity of the pins 82 and 84. Ordinarily the two pins are adjusted to have the same eccentricity but this is not always necessary.

As the wire is gripped between the feed rolls and is fed forward, that is, toward the left as viewed in Fig. 1, it passes over or under an arbor 114, and against a coiling point 116, which deflects the wire downward or upward, according to the adjustment of the coiling tools, and around the arbor to produce either a right or a left-hand spring. The arbor 114 is carried by a tool holder 118, and a pitch tool 120 is also mounted on the holder 118. The function of the pitch tool 120 is to deflect the coil after it has been formed, and to give to it the necessary pitch or space between adjacent convolutions, to which end the pitch tool is adjustable within the holder 118. The diameter of the coil formed by the coiling point 116 is determined by the relative positions of said coiling point and the arbor 114, and means is provided for adjusting the coiling point during the coiling operation. After a coil has been formed, the pitch tool 120 presses against the end of the coil in such a manner as to deflect the wire continuously into a series of spirals of the required pitch, and the adjustment of this tool 120, as well as its movement during coiling, is also provided for.

Following the feeding of a predetermined length of wire and following the completion of a series of coils to constitute a spring, cut-off mechanism including cutting tools 122 comes into operation to effect the severing of the wire at the arbor 114. The cutting tools 122 are mounted on oscillatory heads 124 above and below the arbor 114, and when right-hand springs are being coiled, the lower tool 122 is mounted in its head 124 so as to cooperate with the arbor 114 in cutting the wire. The upper tool 122 is then held to an inactive position, and is only brought into operation when forming left-hand coils.

As has been described, there may be two separate feeding movements of the wire during each cycle, and therefore two springs may be coiled during each cycle. When two separate springs are formed during each cycle, the cut-off mechanism is operated twice during each cycle. The means for operating the cut-off mechanism includes a horizontal cam shaft 126 which is mounted in bearings in the frame members 10, 12 and 14. Mounted on the shaft 126 is a gear 128 which meshes with the gear 96. The pitch diameter of the gear 128 is one-half that of the gear 96 and therefore the gear 128 and the cam shaft 126 make two rotations during each rotation of the gear 96, that is, two rotations during each cycle of the machine. The cam shaft 126 operates the cut-off mechanism and may also operate a mechanism for controlling the diameters of the springs during coiling and a mechanism for controlling the pitches of the springs during coiling. The three last said mechanisms are or may be the same as disclosed in the said Patent 2,119,002 and they need be only briefly described.

As best shown in Fig. 2, the heads 124 carrying the cutters 122 are mounted on shafts 130, 130 rotatably supported in parallel relation between the frame members 10 and 12. The upper shaft 130 carries a collar 132, from which projects an arm 134 pivotally connected to a link 136 which extends downwardly and is indirectly connected at its lower end with an arm 138 mounted on a pivot shaft 140. The arm 138 carries a roll 142 bearing on a cam 144 mounted on the cam shaft 126, the cam 144 being so designed that an oscillatory movement is imparted to the upper cutter shaft 130 during each complete rotation of the cam shaft 126. The mechanism for moving the link 136 is similar to the mechanisms hereinafter described in greater detail for moving similar links for diameter control and for pitch control. Turning movement of the upper cutter shaft 130 is imparted to the lower shaft 130 by means of arms 146 mounted on the shafts and connected by link 148, so that the cutter heads 124 are adapted for synchronous turning movement, although in opposite directions with respect to the coiling arbor 114. The cam 144 imparts two movements to the link 136 during each cycle, the appropriate cutter 122 being actuated twice during each cycle and serving in each instance to sever the wire and to separate a completed spring. The position of the cam 144 on the shaft 126 is such that the cutter 122 engages and severs the wire during each of the intervals D and E between successive feeding periods A and C as indicated in Fig. 7.

The coiling point 116 consists of a bar having a groove at its end to receive the wire being coiled, and is carried by a holder 150 mounted on a pin 152 forming part of a slide 154 movable at right angles to the axis of coiling. Reciprocatory movement is imparted to the slide 154 by means of a link 156 connected at its ends to a pin on the slide and to a crank arm 158. The arm 158 is turnable with a shaft 160 extending through the frame member 10 and provided at its inner end with an operating arm 162. The arm 162 is connected by a link 164 to a lever 166 pivoted on a horizontal pivot rod 168. The lever 166 cooperates with an arm 170 pivoted on said horizontal pivot shaft 140. The arm 170 carries a roll 174 bearing on the face of a cam 176 mounted on the shaft 126. In order to provide for adjustment of the form of a spring, the lever 166 carries an adjustable block 178, whereby the point of application of the force exerted by the cam roll arm 170 may be varied with respect to the pivot of the lever 166. The several elements of the mechanism for actuating the slide 154 are maintained in operative relation by means of a spring 180.

With the parts arranged as shown, each complete rotation of the cam 176 causes the coiling point slide 154 to move back and forth, with reference to the coiling axis, and thereby causes the coiling point 116 to control the diameter of the spring being coiled. By varying the form of the cam 176, it is possible to produce springs of varying contour, such as cone springs, barrel springs or two-diameter springs. The cam 176 imparts two movements to the diameter control mechanism during each cycle, and it therefore serves to control the diameters of two springs during each cycle. The cam 176 acts during the feeding intervals A and C as indicated in Fig. 7.

The pitch tool 120 has a shank not shown extending rearwardly through an opening in the tool holder 118 and pivotally connected to a link 184 which is shown in Fig. 2. The other end of the link 184 is connected to one arm of a bell crank lever 186, pivotally mounted at 188. The other arm of the lever 186 is connected by an adjustable link 189 to a lever 190 similar to the lever 166 and mounted on the same pivot rod 168. A cam 192 on the cam shaft 126 serves to operate the link 188 by mechanism similar to that shown and described for the link 164. The pitch tool may be moved by the mechanism referred to during the coiling of a spring so as to vary the pitch of the spring as required.

With the parts arranged as shown, the pitch may be varied as the spring is coiled. The cam 192 imparts two movements to the pitch control mechanism during each cycle, and it therefore serves to control the pitches of two springs during each cycle. The cam 192 acts during the feeding intervals A and C as indicated in Fig. 7.

After a spring has been coiled with the desired diameter and pitch, as determined by the functioning of the coiling point 116 and of the pitch tool 120, the feed rolls come to rest and one of the cutter 122 operates to sever the completed coil in one of the intervals C and D between successive feeding movements of the wire. The mechanisms for diameter control and for pitch control and for cut-off operate twice during each cycle.

The machine as shown in Figs. 1 to 3 may be variously adjusted for different manners of use, and one adjustment and manner of use have been described in detail for the making of two springs per cycle. In some instances it may be desirable to make one relatively long spring per cycle instead of two short ones. The invention makes it possible to make much longer springs than would be possible with a conventional machine such as that shown in Patent 2,119,002. In order that the machine may make one long spring per cycle, gearing is provided for causing the cam shaft 126 to make one rotation per cycle instead of two rotations per cycle.

As shown, the gear 128 which provides two cam shaft rotations per cycle is longitudinally movable on the shaft 126 to an inoperative position toward the left from the position shown in Fig. 3. The gear may have an annularly grooved hub and a gear shift yoke, not shown, may be entered in the groove in the hub for moving the gear from and to its operative position. Rigidly connected with the gear 94 for rotation therewith is a gear 194. A gear 196 is longitudinally movable on the shaft 126 and is adapted to mesh with the gear 194 when moved to an operative position toward the left from the position shown in Fig. 3. The two gears 194 and 196 have the same pitch diameters. The gear 196 may have an annularly grooved hub and a gear shift yoke, not shown, may be entered in the groove in the hub for moving the gear to and from its operative positions. With the gears 128 and 196 both shifted toward the left, the cam shaft 126 will have one rotation per cycle instead of two rotations per cycle.

The feeding of the wire is not in any way affected by the cam shaft rotation, and there are two feeding periods A and C with intervals D and E between them, as indicated in Fig. 7. However, the cut-off mechanism operates only once per cycle in one or the other of intervals D and E. Assuming that cut-off takes place during the interval D, it will be seen that feeding takes place during the periods C and A, the amount of feeding being twice what it was for the first described adjustment of the machine, wherein the cut-off mechanism operates twice during each cycle. The cams 176 and 192 for controlling diameter and for controlling pitch operate exactly as previously described, but the cams must be so designed as to take into account the two separate feeding movements of the wire with an interval between the said feeding movements.

It is sometimes necessary to make very long springs, that is, springs of indefinite length, and it has been heretofore impracticable to make such springs with a machine of the gear segment type. With a machine embodying the present invention, springs of indefinite length can be readily made. In setting up the machine for such springs, both of the gears 128 and 196 are moved to their idle positions so that the diameter control mechanism and the pitch control mechanism and the cut-off mechanism will not operate. The coiling point 116 and the pitch tool 120 are manually set in fixed positions to provide the spring with the required diameter and pitch.

The direction of rotation of the drive shaft 62 is reversed by reversing the drive motor or otherwise. With reversed rotation of the drive shaft, the gears 94 and 96 and the crankpins 82 and 84 will rotate in the counterclockwise direction instead of in the clockwise direction. It will be apparent from Fig. 4 that, with the direction of rotation reversed, the pin 82 moves counterclockwise from the extreme right position 82$^a$ to the opposite extreme left position 82$^b$ and correspondingly moves the segment 68 and the gear 74 in a period that is a little more than a half-cycle as represented by B, and the action of the clutch 78 is such that the feed rolls rotate in the feeding direction during said period. The pin 82 then moves counterclockwise from the left position 82$^b$ to the right position 82$^a$ and correspondingly moves the segment 68 and the gear 74 in a period that is a little less than a half-cycle. There is no feeding by the clutch 78 during the last said period. It will be observed that during the feeding movement of the pin 82 from position 82$^a$ to position 82$^b$ the gear 74 is rotated relatively slowly and during the return movement of the pin from the position 82$^b$ to the position 82$^a$ said gear is rotated relatively rapidly. As will be apparent from Fig. 5, the pin 84 moves counterclockwise from the extreme right position 84$^a$ to the extreme left position 84$^b$ and correspondingly moves the segment 70 and the gear 76 in a period B that is a little more than a half-cycle, and the action of the clutch 80 is such that the feed rolls rotate in the feeding direction through the last said period. The pin 84 then moves counterclockwise from the left position 84$^b$ to the right position 84$^a$ and correspondingly moves the segment 70 and the gear 76 in a period that is a little less than a half-cycle. There is no feeding by the clutch 80 during the last said period. It will be observed that during the feeding movement of the pin 84 from position 84$^a$ to position 84$^b$ the gear 76 is rotated relatively slowly and during the return movement of the pin from the position 84$^b$ to the position 84$^a$ said gear is rotated relatively rapidly. The two periods of rotation of the feed rolls resulting from the action of the segments 68 and 70 are within the same cycle but they are in opposite phase. Inasmuch as each of the periods is more than a half-cycle, said periods overlap to provide uninterrupted feeding so as to make it possible to coil springs of indefinite length. The overlapping feeding periods are shown in Fig. 8 which is similar to Fig. 7 in that the two feeding periods are shown in their proper phase relationship. Fig. 8 shows that the feeding periods overlap for continuous feeding, whereas as shown in Fig. 7 the feeding periods are spaced to provide intervals for cut-off.

The machine embodying the invention can be adjusted to operate in the same manner as a standard machine as shown in the said patent. To this end the gear 128 is moved to its inoperative position and the gear 196 is moved to its operative position so that the cam shaft 126 makes one revolution for each cycle. One or the other of the gear segments 68 and 70 is made inoperative by adjusting the corresponding pin 82 or 84 to its dead center position. The direction of rotation of the drive shaft is reversed by reversing the drive motor or otherwise.

Figure 9:
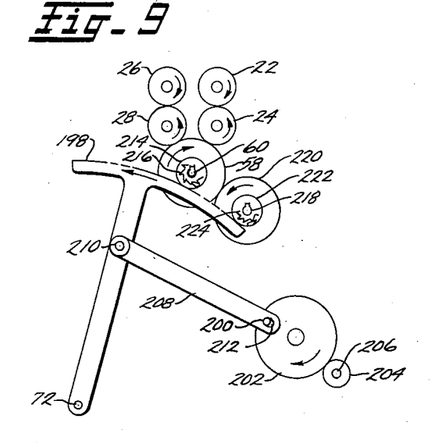
Fig. 9 is a schematic view somewhat similar to Fig. 4 but showing an alternative embodiment of the invention.
Figure 10:
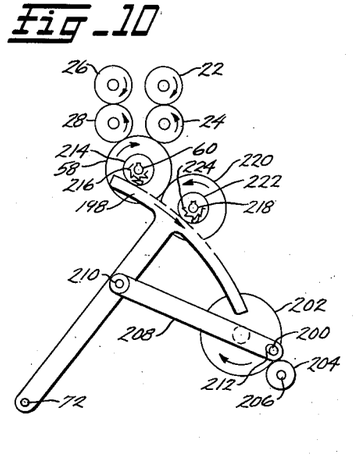
Fig. 10 is a view similar to Fig. 9 but showing some of the parts in different positions.

Figs. 9 and 10 show schematically an alternative embodiment of the invention. In this alternative embodiment the reciprocable means is a single reciprocable member instead of two such members, said member being shown as a single oscillable gear segment 198 instead of two separate gear segments such as 68 and 70. The gear segment 198 may be pivoted on the beforementioned pivot rod 72. For oscillating the gear segment 198 there is provided a suitable means which is preferably constructed and arranged to cause said member to move at the same rate in both directions. Said oscillating means is shown as including a crankpin 200 which may be similar to the crankpins 82 and 84 and which is carried by a gear 202 similar to the gears 94 and 96. The gear 202 is driven by a gear 204 on a main drive shaft 206, this drive shaft being similar to the drive shaft 62 but differently positioned. The crankpin 200, instead of directly engaging the gear segment 198, is connected therewith by a link 208 whic his pivoted to the segment at 210 and which has an opening 212 near the other end, the pin 200 being entered in the opening.

A gear 214 is mounted on the feed shaft 60, being connected therewith by a unidirectional clutch 216, the clutch serving to drive the feed shaft only when the gear 214 is rotated in the clockwise direction. An auxiliary feed shaft 218 is provided and a gear 220 on this shaft meshes with the gear 58. Also mounted on the auxiliary feed shaft 218 and meshing with the gear segment is a gear 222 which is similar to the gear 214. The gear 222 is connected with the auxiliary feed shaft 218 by a unidirectional clutch 224, the clutch serving to drive the auxiliary feed shaft only when the gear 222 is rotated in the counterclockwise direction.

Provision is made in the power connection between the gear 202 and the feed shaft for providing a predetermined amount of lost motion following each motion of the gear segment in at least one direction and preferably following each motion in each direction. This lost motion provides an interval of time between successive feeding operations during which cut-off is effected. This lost motion can be variously provided, but as shown it is provided by making the opening 212 in the link a longitudinal slot.

Except as to the parts last above-described, the alternative machine disclosed in Figs. 9 and 10 may be the same as the machine disclosed in Figs. 1 to 3 and repetition of the description is unnecessary. Provision may be made for causing the cam shaft to have one or two rotations for each cycle.

Fig. 9 shows the gear segment 198 at the completion of its movement toward the left. In so moving, the segment has rotated the gear 214 in the clockwise direction and has thus rotated the fed shaft 60 in the clockwise direction which is the direction for feeding. The gear 222 has also been rotated in the clockwise direction, but the clutch 224 has been inoperative and the gear 220 has been rotated idly in the counterclockwise direction by reason of its engagement with the gear 58.

Fig. 10 shows the gear segment 198 at the completion of its movement toward the right. In so moving, the segment has rotated the gear 220 in the counterclockwise direction and has thus rotated the auxiliary feed shaft 218 in the counterclockwise direction. The gear 220 on the shaft 218 has rotated the gear 58 in the clockwise direction which is the direction for feeding. The gear 214 has also been rotated in the counterclockwise direction, but the clutch 216 has been inoperative and has not interferred with the clockwise direction of the gear 58.

The slot 212 in the link 208 provides the required lost motion which results in a short dwell or interval between each movement of the segment 198 in one direction and its immediately following movement in the opposite direction. Cut-off is effected during this interval. The timing of the feeding and of other operations is therefore the same or substantially the same as shown in Fig. 7.

Figure 11:
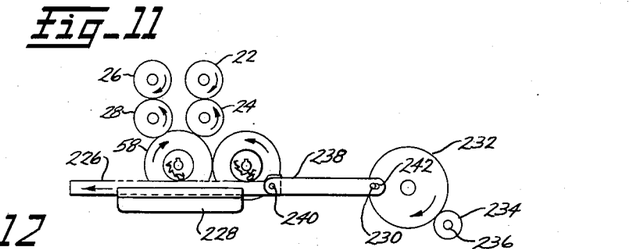
Fig. 11 is a schematic view similar to Fig. 9, but showing another alternative embodiment of the invention.

Fig. 11 shows schematically another alternative embodiment of the invention. In this alternative embodiment the reciprocable means is a single rectilinearly movable member or rack 226 instead of a pivotally movable gear segment such as 198. The rack 226 is rectilinearly guided by a member 228. For reciprocating the rack 226 there is provided a crankpin 230 which may be similar to the crankpins 82 and 84 and which is carried by a gear 232 similar to the gears 94 and 96. The gear 232 is driven by a gear 234 on a main drive shaft 236, this drive shaft being similar to the drive shaft 62 but differently positioned. The crankpin 230, instead of directly engaging the rack 226, is connected therewith by a link 238 which is pivoted to the rack at 240 and which has a short longitudinal slot 242 into which the pin 230 is entered. The gears and other parts for effecting feeding in the machine shown in Fig. 11 are or may be substantially the same as those in the machine shown in Figs. 9 and 10. It is unnecessary to repeat the description of the mechanism or of the manner of operation.

Figure 12:
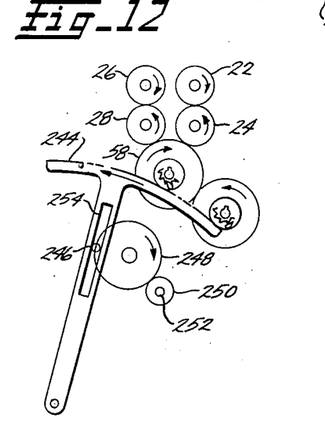
Fig. 12 is a schematic view similar to Fig. 9 but showing still another alternative embodiment of the invention.

Fig. 12 shows schematically still another alternative embodiment of the invention. In this alternative embodiment the reciprocable means is a single member or gear segment 244, the machine being in this respect similar to the machine shown in Figs. 9 and 10. For oscillating the gear segment 244 there is provided a crankpin 246 which may be similar to the crankpins 82 and 84 and which is carried by a gear 248 similar to the gears 94 and 96. The gear 248 is driven by a gear 250 on a main drive shaft 252, this drive shaft being similar to the drive shaft 62 but differentialy positioned. The gear segment 244 has a radial slot 254 and the pin 246 is entered in the slot. The slot is somewhat wider than the diameter of the crankpin with resultant lost motion for the purpose stated in connection with Figs. 9 and 10.

The gears and other parts for effecting feeding in the machine shown in Fig. 12 are or may be substantially the same as those in the machine shown in Figs. 9 and 10.

Figure 13:
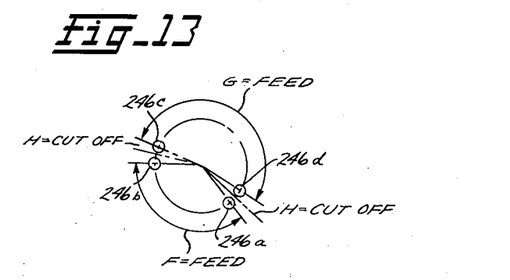
Fig. 13 is a diagram similar to Fig. 7 but showing the timing incident to the mechanism shown in Fig. 12.

The machine as shown in Fig. 12 differs from that shown in Figs. 9 and 10 in that the two feeding periods are not equal. Referring to Fig. 13 it will be evident that the crankpin 246 will move from the position 246$^a$ to the position 246$^b$ in a period F which is less than a half-cycle, feeding being effected during said period. It will also be evident that the crankpin will move from the position 246$^c$ to the position 246$^d$ in a period G which is more than a half-cycle, feeding being effected during said period. There are short intervals H, H between the said feeding periods.

The machine shown in Figs. 12 and 13 may be used for making two short springs during each cycle or for making one relatively long spring during each cycle. The cam shaft may be connected either for two rotations during each cycle or for one rotation during each cycle and the cut-off mechanism may operate either twice or once during each cycle in both or one of the intervals H, H. Inasmuch as the two feeding periods are unequal in time, it is not readily convenient to provide for changes in diameter or in pitch during coiling. However, the coiling point 116 and the pitch tool 120 may be manually set in fixed positions to provide the springs with the required diameter and pitch.

The invention claimed is:

1. In a cyclically operable spring coiling machine, a reciprocable means having gear teeth spaced in the direction of reciprocation, means for causing one complete reciprocation of the reciprocable means during each cycle of the machine, first and second gears meshing with the teeth of the reciprocable means and each rotatable thereby in one direction during the first portion of each cycle and rotatable thereby in an opposite direction during the second portion of each cycle, a feed shaft, feed rolls operably connected with the feed shaft and engageable with a length of wire to effect wire feeding during rotation of the feed shaft, first and second unidirectional clutches operably connected respectively with the first and second gears which first clutch serves upon rotation of the first gear during the first portion of the cycle to rotate the feed shaft in the direction for feeding and which second clutch serves upon rotation of the second gear during the second portion of the cycle to rotate the feed shaft in said direction for feeding so that the two clutches act alternately and repetitively to effect wire feeding during the first and second portions of all cycles, and means engageable by the wire during feeding movement thereof to effect wire coiling so as to thereby form a spring.

2. In a cyclically operable spring coiling machine, a reciprocable means having gear teeth spaced in the direction of reciprocation, means for causing one complete reciprocation of the reciprocable means during each cycle of the machine, first and second gears meshing with the teeth of the reciprocable means and each rotatable thereby in one direction during the first portion of each cycle and then rotatable thereby in an opposite direction during the second portion of each cycle, a feed shaft, feed rolls operably connected with the feed shaft and engageable with a length of wire to effect wire feeding during rotation of the feed shaft, first and second unidirectional clutches operably connected respectively with the first and second gears which first clutch serves upon rotation of the first gear during the first portion of the cycle to rotate the feed shaft in the direction for feeding and which second clutch serves upon rotation of the second gear during the second portion of the cycle to rotate the feed shaft in said direction for feeding so that the two clutches act alternately and repetitively to effect a succession of wire feeding movements during the first and second portions of all cycles, means for providing a short interval of time within each cycle and between two successive wire feeding movements during which interval the feed shaft and the feed rolls are stationary, means engageable by the wire during feeding movement to effect wire coiling so as to thereby form a spring during each cycle, and cut-off mechanism operable during each cycle for engaging and severing the wire while the feed rolls are stationary.

3. In a cyclically operable spring coiling machine, a reciprocable means having gear teeth spaced in the direction of reciprocation, means for causing one complete reciprocation of the reciprocable means during each cycle of the machine, first and second gears meshing with the teeth of the reciprocable means and each rotatable thereby in one direction during the first portion of each cycle and then rotatable thereby in an opposite direction during the second portion of each cycle, a feed shaft, feed rolls operably connected with the feed shaft and engageable with a length of wire to effect wire feeding during rotation of the feed shaft, first and second unidirectional clutches operably connected respectively with the first and second gears which first clutch serves upon rotation of the first gear during the first portion of the cycle to rotate the feed shaft in the direction for feeding and which second clutch serves upon rotation of the second gear during the second portion of the cycle to rotate the feed shaft in said direction for feeding so that the two clutches act alternately and repetitively to effect a succession of wire feeding movements during the first and second portions of all cycles, means for providing short intervals of time between said successive wire feeding movements during which intervals the feed shaft and the feed rolls are stationary, means engageable by the wire during each feeding movement to effect wire coiling so as to thereby form two springs during each cycle, and cut-off mechanism operable twice during each cycle for engaging and severing the wire while the feed rolls are stationary after the forming of the respective springs.

4. In a cyclically operable spring coiling machine, a reciprocable means having gear teeth spaced in the direction of reciprocation, means for causing one complete reciprocation of the reciprocable means during each cycle of the machine, first and second gears meshing with the teeth of the reciprocable means and each rotatable thereby in one direction during the first portion of each cycle and then rotatable thereby in an opposite direction during the second portion of each cycle, a feed shaft, feed rolls operably connected with the feed shaft and engageable with a length of wire to effect wire feeding during rotation of the feed shaft, first and second unidirectional clutches operably connected respectively with the first and second gears which first clutch serves upon rotation of the first gear during the first portion of the cycle to rotate the feed shaft in the direction for feeding and which second clutch serves upon rotation of the second gear during the second portion of the cycle to rotate the feed shaft in said direction for feeding so that the two clutches act alternately and repetitively to effect a succession of wire feeding movements during the first and second portions of all cycles, means for providing two short intervals of time within each cycle and between successive wire feeding movements during which intervals the feed shaft and the feed rolls are stationary, means engageable by the wire during feeding movement to effect wire coiling so as to thereby form either one or two springs during each cycle, cut-off mechanism operable during each cycle for engaging and cutting the wire while the feed rolls are stationary, and means adjustable to cause the cut-off mechanism to operate once during each cycle or twice during each cycle.

5. In a cyclically operable spring coiling machine, a reciprocable means having gear teeth spaced in the direction of reciprocation, means for causing one complete reciprocation of the reciprocable means during each cycle of the machine, first and second gears meshing with the teeth of the reciprocable means and each rotatable thereby in one direction during the first half of each cycle and then rotatable thereby in an opposite direction and to an equal extent during the second half of each cycle, a feed shaft, feed rolls operably connected with the feed shaft and engageable with a length of wire to effect wire feeding during rotation of the feed shaft, first and second unidirectional clutches operably connected respectively with the first and second gears which first clutch serves upon rotation of the first gear during the first half of the cycle to rotate the feed shaft in the direction for feeding and which second clutch serves upon rotation of the second gear during the second half of the cycle to rotate the feed shaft in said direction for feeding so that the two clutches act alternately and repetitively to effect a succession of equal wire feeding movements during the first and second halves of all cycles, means for providing short intervals of time between said successive wire feeding movements during which intervals the feed shaft and the feed rolls are stationary, means engageable by the wire during each feeding movement to effect wire coiling so as to thereby form two springs during each cycle, and cut-off mechanism operable twice during each cycle for engaging and severing the wire while the feed rolls are stationary after the forming of the respective springs.

6. A spring coiling machine as set forth in claim 5, having a cam shaft, means connecting the cam shaft with the drive shaft for causing said cam shaft to make two rotations during each cycle, means including a cam on the cam shaft for operating said cut-off mechanism twice during each cycle, and means including a cam on the cam shaft and including an element operated by the last said cam so as to have two similar movements during each cycle which element is engageable with the wire during the coiling of each spring for controlling the shape of said spring.

7. In a cyclically operable spring coiling machine, two separately reciprocable first and second members having teeth spaced in the direction of reciprocation, means for causing reciprocation of said members oppositely to each other during each cycle of the machine, first and second gears meshing respectively with the teeth of said first and second members and rotatable respectively thereby in opposite directions during each cycle, a feed shaft, feed rolls operably connected with the feed shaft and engageable with a length of wire to effect wire feeding during rotation of the feed shaft, first and second unidirectional clutches operably connected respectively with the first and second gears which first clutch serves upon each rotation of the first gear in one direction to rotate the feed shaft in the direction for feeding and which second clutch serves upon each rotation of the second gear in the last said direction to rotate the feed shaft in said direction for feeding so that the two clutches act alternately and repetitively to effect wire feeding twice during each cycle, and means engageable by the wire during each feeding movement thereof to effect wire coiling so as to thereby form a spring.

8. In a cyclically operable spring coiling machine, similar first and second oscillable gear segments, means for causing one complete oscillation of each gear segment during each cycle of the machine with each segment moving in directions opposite to those of the other, first and second gears meshing respectively with the first and second gear segments which first gear is rotated by its segment in a feeding direction during the first portion of each cycle and is oppositely rotated thereby during the second portion thereof and which second gear is rotated by its segment in the said feeding direction during the second portion of each cycle and is oppositely rotated thereby during the first portion thereof, a feed shaft, feed rolls operably connected with the feed shaft and engageable with a length of wire to effect wire feeding during rotation of the feed shaft, first and second unidirectional clutches operably connected respectively with the first and second gears and serving during rotation of the first and second gears in the said feeding directions thereof to rotate the feed shaft in the direction for feeding so that the two clutches act alternately and repetitively to effect a sucession of wire feeding movements during the first and second portions of all cycles, means for providing short intervals of time between said sucessive wire feeding movements during which intervals the feed shaft and the feed rolls are stationary, means engageable by the wire during each feeding movement to effect wire coiling so as to thereby form two springs during each cycle, and cut-off mechanism operable twice during each cycle for engaging and severing the wire while the feed rolls are stationary after the forming of the respective springs.

9. In a cyclically operable spring coiling machine, similar first and second oscillable gear segments, means for causing one complete oscillation of each gear segment during each cycle of the machine with each segment moving in directions opposite to those of the other, first and second gears meshing respectively with the first and second gear segments which first gear is rotated by its segment in a feeding direction during the first portion of each cycle and is oppositely rotated thereby during the second portion thereof and which second gear is rotated by its segment in the said feeding direction during the second portion of each cycle and is oppositely rotated thereby during the first portion thereof, a feed shaft, feed rolls operably connected with the feed shaft and engageable with a length of wire to effect wire feeding during rotation of the feed shaft, first and second unidirectional clutches operably connected respectively with the first and second gears and serving during rotation of the first and second gears in the said feeding directions thereof to rotate the feed shaft in the direction for feeding so that the two clutches act alternately and repetitively to effect a succession of wire feeding movements during the first and second portions of all cycles, means for providing two short intervals of time within each cycle and between successive wire feeding movements during which intervals the feed shaft and the feed rolls are stationary, means engageable by the wire during feeding movement to effect wire coiling so as to thereby form either one or two springs during each cycle, cut-off mechanism operable during each cycle for engaging and cutting the wire while the feed rolls are stationary, and means adjustable to cause the cut-off mechanism to operate once during each cycle or twice during each cycle.

10. In a cyclically operable spring coiling machine, two separately reciprocable first and second members having teeth spaced in the direction of reciprocation, means for causing reciprocation of said members oppositely to each other during each cycle of the machine which means is constructed to move each member relatively rapidly in one direction during a relatively short period of less than half of a cycle and relatively slowly in the opposite direction during a relatively long period which is the remainder of the cycle, first and second gears meshing respectively with the teeth of said first and second members and rotatable respectively thereby in opposite directions and at different speeds during each cycle, a feed shaft, feed rolls operably connected with the feed shaft and engageable with a length of wire to effect wire feeding during rotation of the feed shaft, first and second unidirectional clutches operably connected respectively with the first and second gears which first clutch serves upon each relatively rapid and relatively short rotation of the first gear in one direction to rotate the feed shaft in the direction for feeding and which second clutch serves upon each relatively rapid and relatively short rotation of the second gear in the last said direction to rotate the feed shaft in said direction for feeding so that the two clutches act alternately and repetitively to effect wire feeding twice during each cycle with short intervals of time between successive feeding movements, means engageable by the wire during each feeding movement thereof to effect wire coiling so as to thereby form a spring, and cut-off mechanism operable during each cycle for engaging and severing the wire while the feed rolls are stationary.

11. In a cyclically operable spring coiling machine, similar first and second gear segments oscillable about a common axis and having radial slots, two oppositely disposed crankpins rotatable about a common axis parallel with the first said axis which pins are entered respectively in the slots in the segments, means operable for effecting one revolution of the crankpins during each cycle of the machine so that each segment has one complete reciprocation during each cycle with the movement in one direction faster than that in the opposite direction, first and second gears meshing respectively with the first and second gear segments and each rotated by its segment alternately in a feeding direction and to an equal extent in an opposite direction with the rotation in the feeding direction faster than that in the opposite direction, a feed shaft, feed rolls operably connected with the feed shaft and engageable with a length of wire to effect wire feeding during rotation of the feed shaft, first and second unidirectional clutches operably connected respectively with the first and second gears and serving during rotation of the first and second gears in the said faster feeding direction thereof to rotate the feed shaft in its feeding direction so that the two clutches act alternately and repetitively to effect a succession of wire feeding movements during the first and second halves of all cycles, the faster rotation of the gears in said feeding direction providing short intervals of time between said successive wire feeding movements during which intervals the feed shaft and the feed rolls are stationary, means engageable by the wire during each feeding movement to effect wire coiling so as to thereby form two springs during each cycle, and cut-off mechanism operable twice during each cycle for engaging and severing the wire while the feed rolls are stationary after the forming of the respective springs.

12. In a cyclically operable spring coiling machine, two separately reciprocable first and second members having teeth spaced in the direction of reciprocation, means for causing reciprocation of said members oppositely to each other during each cycle of the machine which means is constructed to move each member relatively rapidly in one direction during a relatively short period of less than half of a cycle and relatively slowly in the opposite direction during a relatively long period which is the remainder of the cycle, first and second gears meshing respectively with the teeth of said first and second members and rotatable respectively thereby in opposite directions and at different speeds during each cycle, a feed shaft, feed rolls operably connected with the feed shaft and engageable with a length of wire to effect wire feeding during rotation of the feed shaft, first and second unidirectional clutches operably connected respectively with the first and second gears which first clutch serves upon each relatively slow and relatively long rotation of the first gear in one direction to rotate the feed shaft in the direction for feeding and which second clutch serves upon each relatively slow and relatively long rotation of the second gear in the last said direction to rotate the feed shaft in said direction for feeding so that the two clutches act alternately and repetitively to effect wire feeding movements which overlap so that the wire is fed without interruption, and means engageable by the wire during feeding movement to effect wire coiling so as to thereby form a spring.

13. In a cyclically operable spring coiling machine, similar first and second gear segments oscillable about a common axis and having radial slots, two oppositely disposed crankpins rotatable about a common axis parallel with the first said axis which pins are entered respectively in the slots in the segments, means operable for effecting one revolution of the crankpins during each cycle of the machine so that each segment has one complete reciprocation during each cycle with the movement in one direction slower than that in the opposite direction, first and second gears meshing respectively with the first and second gear segments and each rotated by its segment alternately in a feeding direction and to an equal extent in an opposite direction with the rotation in the feeding direction slower than that in the opposite direction, a feed shaft, feed rolls operably connected with the feed shaft and engageable with a length of wire to effect wire feeding during rotation of the feed shaft, first and second unidirectional clutches operably connected respectively with the first and second gears and serving during rotation of the first and second gears in the said slower feeding direction to rotate the feed shaft in the feeding direction so that the two clutches act alternately and repetitively to effect a succession of wire feeding movements during the first and second halves of all cycles, the slower rotation of the gears in said feeding direction causing the said feeding movements to overlap so that the wire is fed without interruption, and means engageable by the wire during feeding movement to effect wire coiling so as to thereby form a spring.

14. In a cyclically operable spring coiling machine, a single reciprocable member having gear teeth spaced in the direction of reciprocation, means for causing one complete reciprocation of the reciprocable member during each cycle of the machine, first and second gears meshing with the teeth of the reciprocable member and each rotatable thereby in a first direction during the first portion of each cycle and then each rotatable thereby in the reverse or second direction during the second portion of each cycle, a feed shaft, feed rolls operably connected with the feed shaft and engageable with a length of wire to effect wire feeding during rotation of the feed shaft, first and second unidirectional clutches operably connected respectively with the first and second gears which first clutch is directly connected with the feed shaft and serves upon rotation of the first gear in the first direction during the first portion of the cycle to rotate the feed shaft in the direction for feeding and which second clutch is reversely connected with the feed shaft and serves upon rotation of the second gear in the second direction during the second portion of the cycle to rotate the feed shaft in said direction for feeding so that the two clutches act alternately and repetitively to effect a succession of wire feeding movements during the first and second portions of all cycles, and means engageable by the wire during feeding movement thereof to effect wire coiling so as to thereby form a spring.

15. In a cyclically operable spring coiling machine, a single reciprocable member having gear teeth spaced in the direction of reciprocation, means for causing one complete reciprocation of the reciprocable member during each cycle of the machine, first and second gears meshing with the teeth of the reciprocable member and each rotatable thereby in a first direction during the first portion of each cycle and then each rotatable thereby in the reverse or second direction during the second portion of each cycle, a feed shaft, feed rolls operably connected with the feed shaft and engageable with a length of wire to effect wire feeding during rotation of the feed shaft, first and second unidirectional clutches operably connected respectively with the first and second gears which first clutch is directly connected with the feed shaft and serves upon rotation of the first gear in the first direction during the first portion of the cycle to rotate the feed shaft in the direction for feeding and which second clutch is reversely connected with the feed shaft and serves upon rotation of the second gear in the second direction during the second portion of the cycle to rotate the feed shaft in said direction for feeding so that the two clutches act alternately and repetitively to effect a succession of wire feeding movements during the first and second portions of all cycles, means for providing short intervals of time between said successive wire feeding movements during which intervals the feed shaft and the feed rolls are stationary, means engageable by the wire during each feeding movement to effect wire coiling so as to thereby form two springs during each cycle, and cut-off mechanism operable twice during each cycle for engaging and severing the wire while the feed rolls are stationary after the forming of the respective springs.

16. A spring coiling machine as set forth in claim 15, wherein the means for causing one complete reciprocation of the reciprocable member is constructed and arranged to cause said member to move at the same rate in both directions.

(References on following page)

References Cited in the file of this patent

UNITED STATES PATENTS

| | | |
|---|---|---|
| 43,558 | Akins | July 19, 1864 |
| 236,717 | Nichols | Jan. 18, 1881 |
| 285,372 | Babcock | Sept. 25, 1883 |
| 1,413,970 | Curioni | Apr. 25, 1922 |
| 1,516,734 | Johnson | Nov. 25, 1924 |
| 1,555,745 | Carrasco | Sept. 29, 1925 |
| 2,119,002 | Bergevin | May 31, 1938 |
| 2,170,984 | Bergevin | Aug. 29, 1939 |
| 2,337,420 | Spaulding | Dec. 21, 1943 |

FOREIGN PATENTS

| | | |
|---|---|---|
| 355,657 | France | June 27, 1905 |
| 20,707 | Austria | July 25, 1905 |